United States Patent [19]

Johnson

[11] Patent Number: 4,891,932
[45] Date of Patent: Jan. 9, 1990

[54] GRAIN-SAVER DAM FOR COMBINE CUTTER BAR

[76] Inventor: William A. Johnson, 12406 Taylorsville Rd., Jeffersontown, Ky. 40299

[21] Appl. No.: 368,259

[22] Filed: Jun. 19, 1989

[51] Int. Cl.$^4$ .................... A01D 55/02; A01D 55/26
[52] U.S. Cl. ........................ 56/158; 56/260; 56/296
[58] Field of Search .................... 56/158–162, 56/173, 252, 257–260, 296–299, 14.5, 14.6

[56] References Cited

U.S. PATENT DOCUMENTS

| | | | |
|---|---|---|---|
| 2,448,078 | 8/1948 | Brown | 56/158 |
| 2,836,026 | 5/1958 | Gray et al. | 56/158 |
| 3,813,859 | 0/1974 | Fuller et al. | 56/260 |
| 3,866,400 | 0/1975 | May | 56/158 |
| 3,961,465 | 0/1976 | Winings | 56/13.1 |
| 3,986,610 | 0/1975 | Hiniker | 56/15.8 |
| 4,156,338 | 0/1979 | Hengen | 56/106 |
| 4,198,803 | 0/1980 | Quick et al. | 56/296 |

*Primary Examiner*—Thuy M. Bui
*Attorney, Agent, or Firm*—William R. Price

[57] ABSTRACT

A dam, positioned behind the sickle blades on the cutter bar of a combine, prevents rocks and dirt from entering the combine and saves grain pods, prematurely dislodged from the stem, from falling from the combine header platform onto the ground. The grain-saver dam may be made in sections, bolted together loosely, so as to flex with the flexible cutter bars utilized on today's combines, or may be of one piece for use with a rigid cutter bar.

7 Claims, 3 Drawing Sheets

GRAIN-SAVER DAM FOR COMBINE CUTTER BAR

FIELD OF THE INVENTION

This invention relates to harvesting of crops and to harvesting machines, in the form of combines. More particularly, this invention relates to a grain-saver dam, mounted on the cutter bar, immediately behind the sickle bar of the cutter bar assembly of the combine.

DESCRIPTION OF THE PRIOR ART

Applicant is aware of the following prior art patents:

| U.S. PAT. NOS. | INVENTOR | DATE |
| --- | --- | --- |
| 3,813,859 | Fuller, et al | 1974 |
| 3,866,400 | May | 1975 |
| 3,896,610 | Hiniker | 1975 |
| 3,961,465 | Winings | 1976 |
| 4,156,338 | Hengen | 1979 |
| 4,198,803 | Quick, et al | 1980 |

Combines are well known in the art. In harvesting cereal grains, rigid cutter bars have been utilized. However, in low-growing crops, such as soybeans, it is advantageous to use a flexible or floating cutter bar assembly, so as to mow the crop as close to the ground as possible, in areas in which the land is uneven. Floating, flexible cutter bars are disclosed and claimed by Fuller, in 3,813,859; May, in 3,866,400; Hiniker, in 3,896,610; and Quick, in 4,198,803. While floating or flexible cutter bars do increase the crop yield by cutting the stem closer to the ground, especially in harvesting of soybeans, still some crop is lost. The moisture content of the crop being harvested affects loss due to shatter. In harvesting soybeans having a moisture content of about 13%, there is a loss of about two bushels of beans per acre. If the moisture concentration decreases to about 11%, the loss of beans increases to about four bushels per acre. If the moisture concentration of the plant is 9% or less, the loss per acre due to shatter increases drastically. This has been recognized in the art. Winings, for example, in U.S. Pat. No. 3,961,465, provided a secondary harvesting device, which was vacuum-operated, to pick up beans or grain knocked to the ground, under the primary harvester. Winings also picked up rocks and dirt. Additionally, with floating cutter bars, rocks and dirt tend to get into the harvesting apparatus and cause damage to the intricate mechanism, thereby causing downtime and repair. Hengen, of Deere and Company in U.S. Pat. No. 4,156,338, proposed a pair of rock deflectors, attached to opposite frame elements, including a plurality of fore and aft fingers, sufficiently wide to allow passage of the crop, but which served to deflect larger rocks and foreign objects from entering into the combine mechanism. Hengen also provided so as to prevent damage to the cutting apparatus or incorporation of such objects into the combine mechanism.

SUMMARY OF THE INVENTION

According to this invention, a grain-saver dam structure is mounted onto the cutter head, directly behind the sickle bar. The dam is sufficiently high to prevent rocks and large objects from entering the combine header and simultaneously prevent grain or bean pods, displaced by shatter, from feeding from the platform of the combine header back onto the ground.

DESCRIPTION OF THE PREFERRED EMBODIMENT

Figure 1:
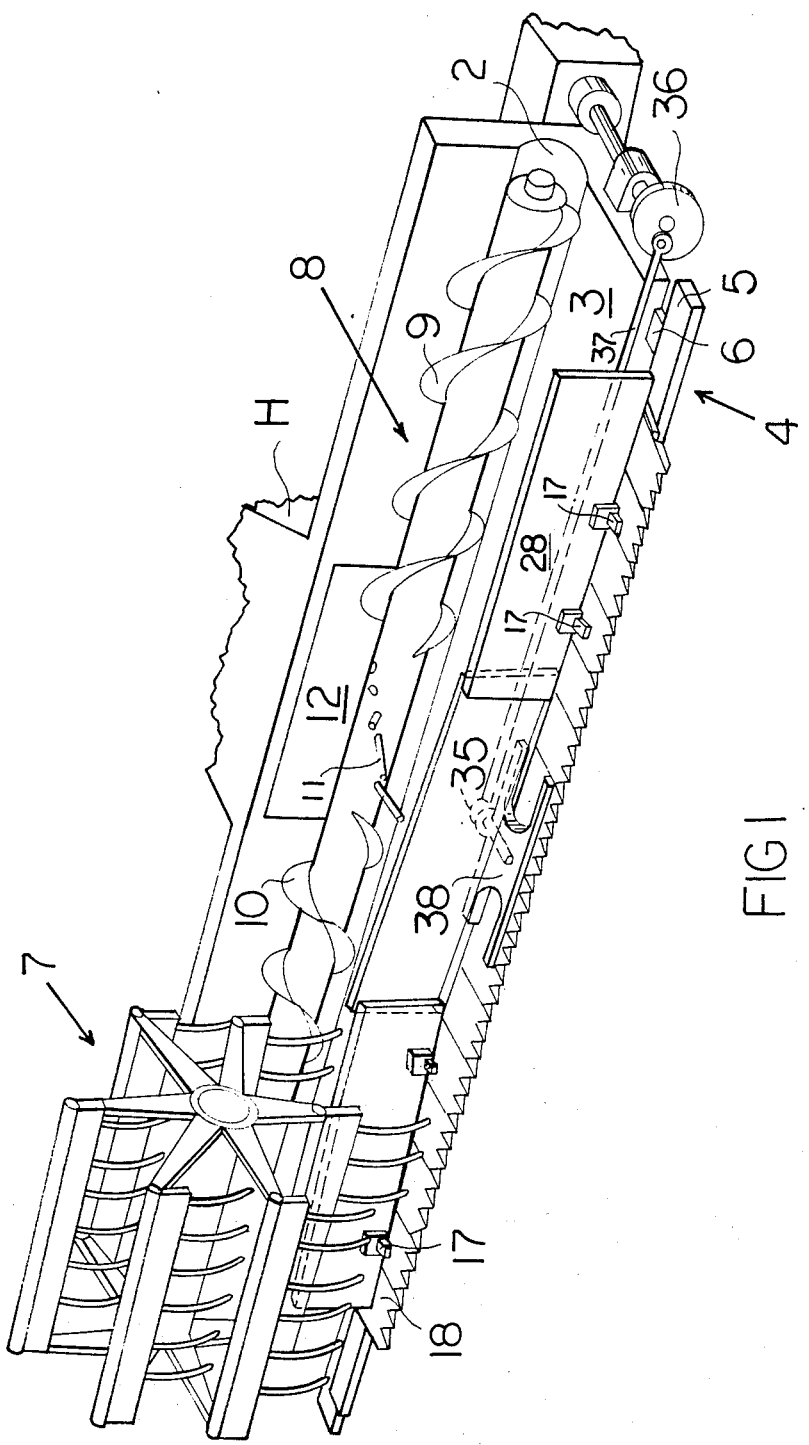
FIG. 1 is a fragmentary, perspective view of the header of a combine, having a grain-saver dam mounted on the cutter bar to exclude dirt and rocks on one side and to collect beans on the other.
Figure 2:
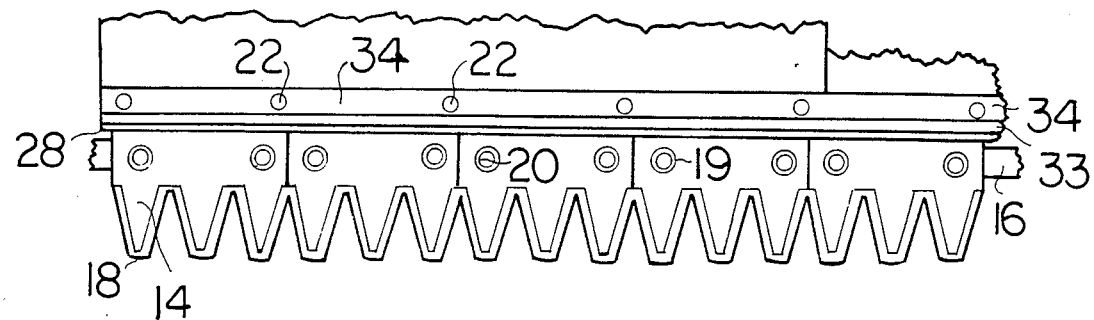
FIG. 2 is an enlarged, fragmentary top view of the cutter bar, taken along lines 2—2 of FIG. 1.
Figure 3:
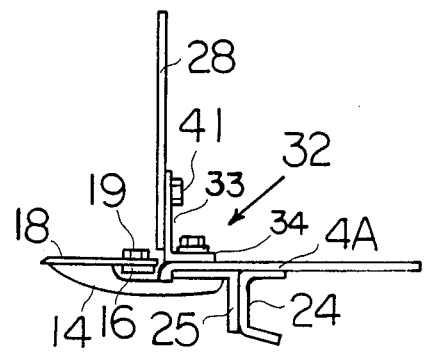
FIG. 3 is a fragmentary view, in perspective, illustrating a rigid cutter bar mounted on the combine header and illustrating a grain-saver dam mounted thereon.
Figure 5:
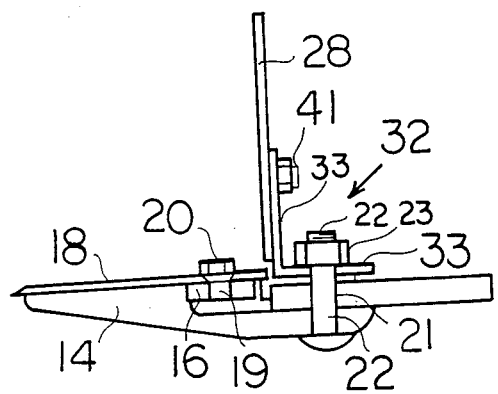
FIG. 5 is an enlarged sectional view of the cutter bar with the grain-saver dam of this invention mounted thereon.
Figure 6:
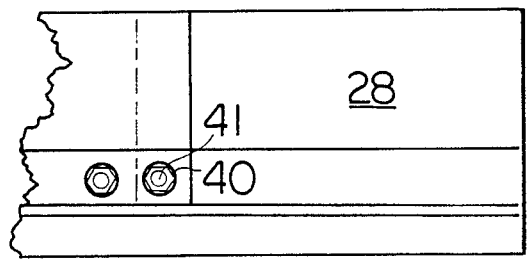
FIG. 6 is a fragmentary, elevational view from the rear, illustrating the mounting means for the grain-saver dam of the invention.

Referring now to the drawings and particularly to FIG. 1, a header H for a crop harvesting combine supports a cutter bar 4. The cutter bar is of the flexible or floating type, and consists of a back bar 5, positioned by a supporting arm 6, which may be spring loaded. The support given to the back bar 5 by the spring-loaded supporting arm 6 allows the cutter bar to float along and conform to the contour of the ground and thereby float, relative to the header H. This is extremely advantageous in harvesting of low-growing crops, such as soybeans, so as to sever the stem of the soybean plant close to the ground. As the stems are severed by the cutter bar 4, a reel 7 assists the movement of the cut stems and plants to a collecting auger 8. The platform 3 of the header H contains a depression forming a trough 2 in the area of the auger 8. The auger 8 is equipped with auger blades 9 and 10, which push the stems in opposite directions, toward the center, to feed the harvested crop to chute 12. It will be noted that the auger contains retractable fingers 11, which seize upon the cut stems containing the pods of soybeans to help push them into the chute 12. A guard 14, of a series of juxtaposed guard sections, is fastened to the back bar 5, while a sickle or knife bar 16 is reciprocally supported on the back bar 5 and guard 14. A series of hold-down clips 17 are arranged in spaced relation along the cutter bar to hold the sickle bar 16 in place and prevent it from moving upwardly, relative to the guard. As can best be seen in FIG. 5, the grain-saver dam 28 is mounted onto the back bar 5 of the cutter bar 4, by means of an angle iron 32. Angle iron 32 has a vertical leg 33 and a horizontal leg 34. A bolt 22 fits in hole 21 of the back bar 5, to secure the guard 14 into place. Bolt 22 projects through a hole in the horizontal leg 34 of angle iron 32 to secure the angle iron onto the back bar 5 of the cutter bar 4. Thereafter, the upstanding portion 29 of the grain-saver dam 28 is bolted to the vertical leg 33 of the angle iron 32. The hole 40 in the angle iron and in the upstanding portion 29 of the grain-saver dam 28 is ⅜" for reception of a 3/16" bolt 41. This allows for a certain flexion of the grain-saver saver dam 28 to correspond with the flexing of the floating cutter bar 4. The sickle bar 16 is bolted to the blade or knife section 18 by means of bolt 19 and nut 20. As is well known in the art, the sickle bar is powered by a drive crank 36, attached to a drive rod 37, which, in turn, attaches to pitman 35, which is attached to the drive plate 38. The reciprocating motion, therefore, of the drive rod 37 and the pitman 35 connected to the drive plate 38, pushes the sickle bar 16 and the knives 18 bolted thereto in a reciprocal fashion between the prongs of the guard members 14. As previously mentioned, it is possible to utilize a rigid cutter bar 4A. As is shown in FIG. 3, rigid cutter bar 4A is supported by a channel member 24 attached to the platform 3 of the header H and an angle iron 25. Again, the guard member 14 is secured in place by a bolt 22 which serves also to secure the angle iron 32 into position to act as a support through its vertical leg 33 for the upstanding portion 29 of the grain-saver dam 28. It is possible, therefore, with the rigid cutter bar 4A, to utilize a grain-saver dam of unitary construction, stretching across the entire cutter bar area.

As to the dimensions of the grain-saver dam, I prefer a vertical height of about 3 inches. This is located, as has been noted, directly behind the blades 18 of the sickle bar 16. A dam of 1½ inches is not very effective, either in preventing rocks and debris from entering the header portion of the combine or in trapping beans which have been prematurely harvested, due to shatter. The height of the bar can range anyplace from 2 to 4 inches, although a height of 3 inches is actually preferred. Additionally, as has been indicated, the grain-saving dam 28 can be made in sections of 12 inches or so in length, which are mounted so as to overlap about 1 inch from one section to the other. The two sections are closely bolted together, by means of a 3/16" bolt 41, fitted into a ¼" hole. Thus, as the flexible back bar flexes in going over uneven terrain, there is sufficient flexion between the two sections of the grain-saver dam to prevent undue stress on the cutter bar 5.

Figure 7:
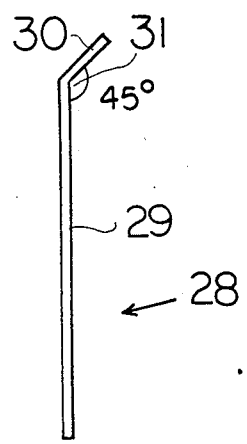
FIG. 7 is an end view of a section of a preferred embodiment of the grain-saver dam of this invention, drawn to actual scale.

As is indicated, a preferred form of each section is shown in FIG. 7. In this instance, the upstanding portion 29 of the grain-saver dam 28 is 2⅝ inches in height and the top portion is rolled back to form a rolled-back portion 30 of ⅜-inch in length, which defines an angle 31 of 45°.

Figure 4:
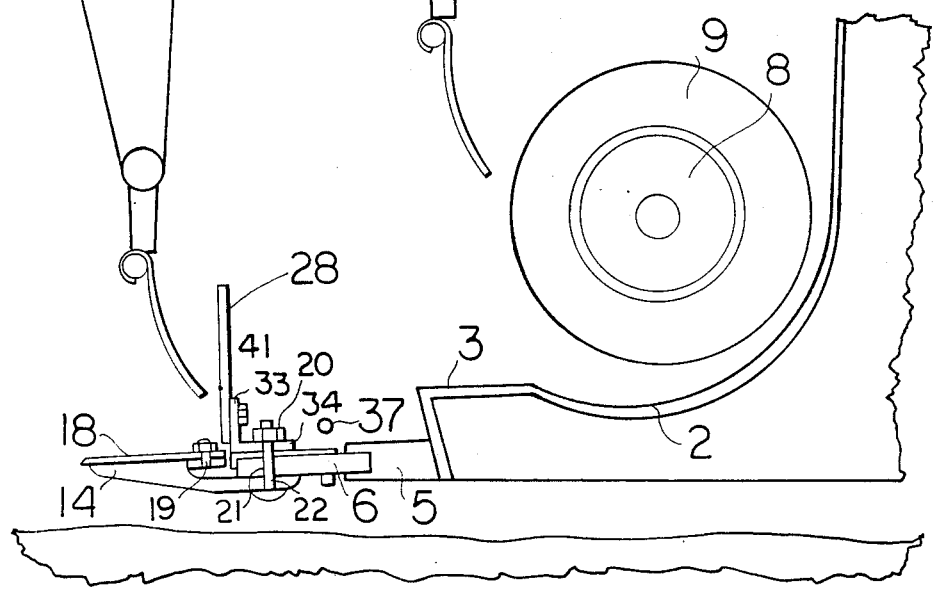
FIG. 4 is an enlarged, fragmentary sectional view, taken along lines 4—4 of FIG. 1.

As has been illustrated, the grain-saver dam is extremely close to the sickle bar 16, supported by the bolts normally used for the knife guards 14. This, and the height of the dam, are believed to be the two factors allowing for the grain-saver dam's effectiveness. As will be noted in FIG. 1 and FIG. 4, the depending wire members from reel 7 are well below the top portion of the upstanding part 29 of the grain-saver dam 28. Additionally, the dam is quite close to the cutter blade 18, so that the cut stems are immediately transported over the dam 28 and into contact with the blades 9 and 10 of auger 8. Hence, rapid movement of the cut stems bearing the beans, prevents reel threshing and shatter in the area of the platform 3 of the combine head. In other words, the cut stems bearing the beans are quickly transported to the auger and then moved into the chute 12 of the combine harvester. Any beans which are prematurely dislodged are not lost onto the ground, but are maintained on the platform 3 and in trough 2 by the upstanding portion 29 of the grain-saver dam 28. Thus, the normal losses, even with plants of low moisture, are not encountered, since the prematurely-harvested beans do not fall back onto the ground, but are maintained on the platform 3 or the trough 2 of the header H.

Many modifications will occur to those skilled in the art and the description of the embodiments shown herein are meant to be exemplary and nonlimiting, except so as to conform to the scope of the appended claims.

I claim:

1. For use with a combine harvesting machine, having a cutter bar, including a reciprocating sickle bar, a dam, having an upstanding body portion, extending vertically to a height in the range of 2 to 4 inches and mounted on said cutter bar, behind said reciprocating sickle bar and extending across the long axis of said cutter bar.

2. A dam, as defined in claim 1, comprising a series of sections, loosely bolted together with overlapping end parts, forming said body portion, so as to flex with the cutter bar.

3. A dam, as defined in claim 2, in which said vertical body portion is in excess of 2 inches, but having an upper portion, rolled back at an angle of no more than 45°.

4. A combine harvesting machine, having a cutter bar, comprising a back bar, guard means bolted to said back bar in juxtaposed guard sections and a reciprocal sickle bar, having juxtaposed knife blades attached thereto, wherein the improvement comprises a dam member and dam mounting means, said dam member being mounted on said back bar and having an upstanding body portion, extending vertically in the range of from 2 to 4 inches and said mounting means being mounted on said back bar with bolts which extend through said guard means, back bar and dam mounting means.

5. A combine harvesting machine, as defined in claim 4, in which said dam mounting means includes an angle iron, having a vertical leg and a horizontal leg, said horizontal leg being mounted to said back bar and said body portion of said dam being mounted to the vertical leg of said angle iron.

6. A combine harvesting machine, as defined in claim 4, in which said dam portion comprises a series of sections, loosely bolted together, with overlapping end portions, forming an integral body portion, which flexes with said back bar.

7. A combine harvesting machine, as defined in claim 6, in which each section of said dam portion has a vertical body portion in excess of 2 inches and an upper portion, rolled over rearwardly, at an angle of no more than 45°.

* * * * *